No. 872,319. PATENTED DEC. 3, 1907.
L. F. ADT.
BRIDGE SPRING FOR EYEGLASSES.
APPLICATION FILED MAR. 6, 1905.
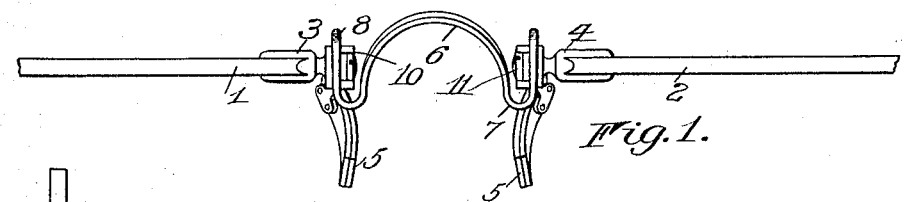
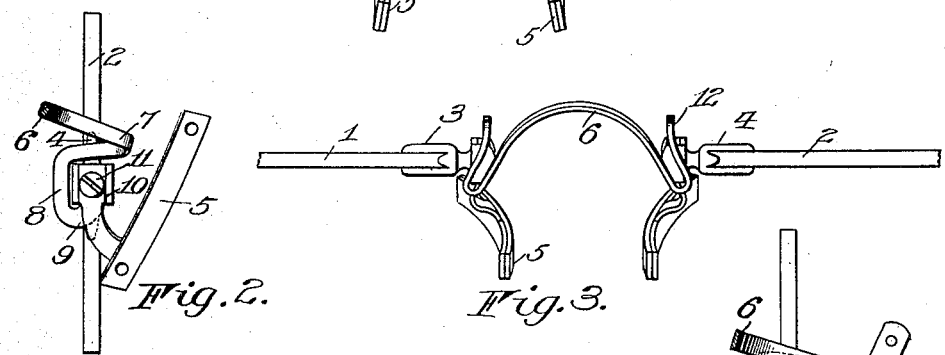
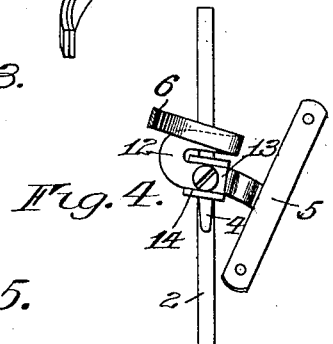
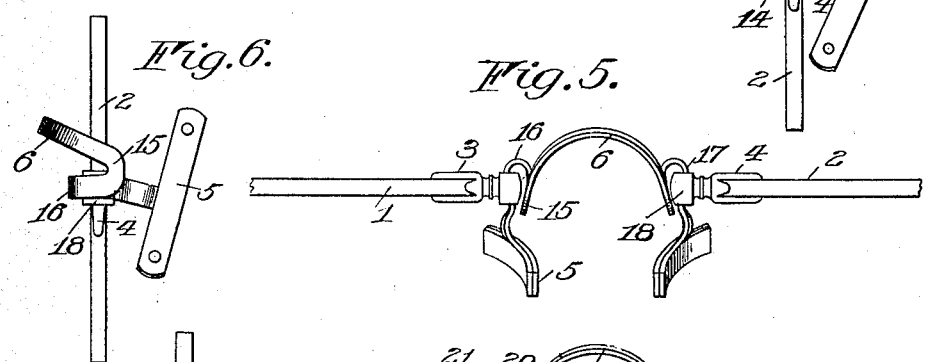
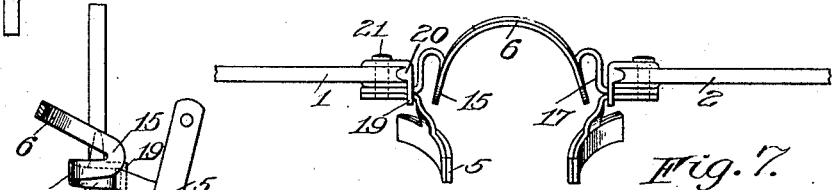
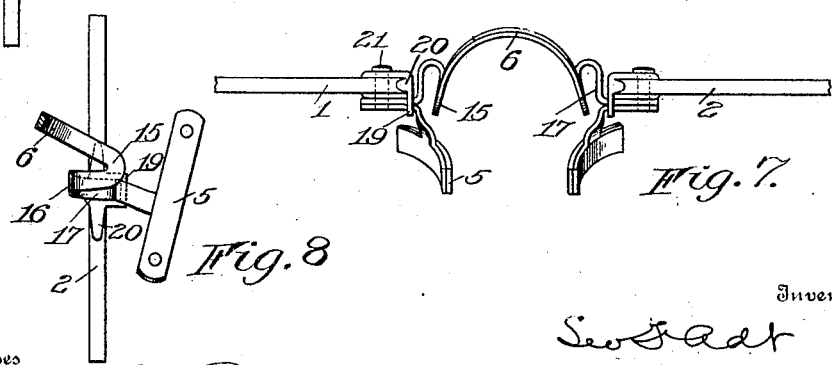
Witnesses
Walter B. Payne.
Clarence A. Bateman.
Inventor
Leo F. Adt
By Frederick Church
Attorney

UNITED STATES PATENT OFFICE.

LEO F. ADT, OF TROY, NEW YORK.

BRIDGE-SPRING FOR EYEGLASSES.

No. 872,319.

Specification of Letters Patent.

Patented Dec. 3, 1907.

Application filed March 6, 1905. Serial No. 248,425.

*To all whom it may concern:*

Be it known that I, LEO F. ADT, of Troy, in the county of Rensselaer and State of New York, have invented certain new and useful Improvements in Bridge-Springs for Eyeglasses; and I do hereby declare the following to be a full, clear, and exact description of the same, reference being had to the accompanying drawings, forming a part of the specification, and the reference-numerals marked thereon.

My present invention relates to improvements in mountings for eyeglasses, and the purpose of my invention is to provide a bridge spring for connecting the lenses which will possess ample resiliency to insure the proper action of the guards and spring in applying and removing the eyeglasses, and has provision for varying widely the pupillary distance between the lens centers to accommodate the eyeglasses to different persons without disturbing materially the shape of the bridge and which adjustment is secured without rendering the bridge too flexible as this would cause instability of the lenses when the eyeglasses are in position.

To these and other ends the invention consists in certain improvements and combinations of parts all as will be hereinafter more fully described, the novel features being pointed out in the claims at the end of the specification.

In the drawings: Figures 1 and 2 represent respectively a plan view and a transverse section of mounting embodying my invention; Figs. 3 and 4 represent respectively a plan view and a transverse section of another form of mounting constructed in accordance with my invention; Figs. 5 and 6 represent in plan and section respectively another way of forming the spring in accordance with my invention; and Figs. 7 and 8 are views in plan and section respectively of a spring similar to that shown in Figs. 5 and 6 adapted for a different form of attaching devices.

Similar reference numerals in the several figures indicate similar parts.

In the various forms of my invention 1 and 2 designate the lenses provided with the attaching devices 3 and 4 for the guards 5 and the bridge spring, the latter being preferably composed of flat material. This spring in the form shown in Figs. 1 and 2 embodies the central portion 6 which is arched forwardly as usual and is provided at its ends with the horizontal loops or bends 7 formed by extending the ends of the spring rearwardly, thence outwardly and doubling forwardly flatwise of the material, thus extending over the attaching devices to the front thereof, and then bending downwardly, rearwardly and finally upwardly edgewise of the material to form the vertical loop or bend 8, the sides of which lie in a plane perpendicular to the plane of the lenses. The upwardly-extending portion 9 of the vertical bends 8 forms an attaching arm which enters the vertically-arranged seat 10 of the attaching devices from the bottom thereof and is secured by the usual fastening screw 11, the additional length in the spring formed by the bends 8 being taken up without increasing the width of the spring by extending the material around the attaching devices.

In that form of spring shown in Figs. 3 and 4 the ends of the spring are doubled flatwise to form the horizontal loops or bends 7, and the forwardly-extending arms of these horizontal loops or bends are doubled downwardly and rearwardly in a direction edgewise of the material to form the vertical loops or bends 12 which lie in planes transverse to the plane of the lenses, the rearwardly-extending attaching arms 13 thus formed in the loops 12 being arranged substantially horizontally and adapted to enter the correspondingly formed seats 14 in the attaching devices.

In those forms of spring shown in Figs. 5 to 8 inclusive, the central portion is arched forwardly as usual, and the rearwardly-extending ends of the spring are doubled downwardly and thence forwardly edgewise of the material to form the vertical bends or loops 15, the sides of the latter lying in a plane transverse of the lenses. The forwardly-extending arms of the loops 15 are doubled outwardly and rearwardly to form the horizontal loops 16, the rearwardly-extending arms 17 of these loops being formed for attachment to the attaching devices, a horizontal seat 18 being provided in the attaching devices in Figs. 5 and 6 for the reception of these attaching arms, and in the form shown in Figs. 7 and 8 these attaching arms of the spring are extended outwardly behind the lenses and through the apertured lug 19 of the clip 20, the latter being fitted over the edge of the lens and provided with a fastening screw 21 for securing the spring and in using the clip 20 the usual parts are omitted, and therefore the loops may be placed close to the inner edges of the lenses to reduce the pupillary distance of the lenses.

The combined action of the horizontal and vertical loops or bends in the spring afford ample resiliency to enable the lenses to be operated in separating and proximating the guards, and the extended length of the spring is taken up between the lenses by forming it into the vertically-arranged loops or bends; and this enables a narrow bridge spring having a considerable length of material to be employed which will permit a wide range of adjustment by the optician in fitting the eyeglasses to suit the pupillary distance of the wearer's eyes that may vary considerably, and by forming the extended length of the bridge into the vertical loops extending transversely of the lenses, the bridge will possess ample stiffness and rigidity to insure firmness of the eyeglasses when supported on the wearer's nose, and this is particularly advantageous when flat stock is employed and the material is doubled edgewise to form these vertical loops.

When it is desirable to vary the pupillary distance between the lenses, the optician may apply the pincers to the vertical loops and twist them so as to offset the upper and lower arms of each loop, and in this way the width of the spring may be increased or decreased as desired.

I claim as my invention:

1. In eyeglasses, the combination with the lenses, of a bridge connecting the lenses having its ends bent alternately into horizontal and vertical loops the latter having their arms arranged transversely to the plane of the lenses, said loops being arranged intermediate the attaching ends and the central portion.

2. In eyeglasses, the combination with the lenses, of a bridge spring connecting them composed of flat material having horizontal loops formed therein by bending the material flatwise, and vertical loops formed by doubling the material edgewise and transversely to the plane of the lenses.

3. In eyeglasses, the combination with the lenses, of a bridge connecting them and having a central portion, horizontal and vertical loops at the ends of the central portion, formed by bending the material alternately flatwise and edgewise, the edgewise loops being transverse to the plane of the lenses.

4. In eyeglasses, the combination with the lenses, and the attaching devices thereon, of a bridge for connecting the lenses embodying a central portion having its ends extended rearwardly and doubled forwardly to form horizontal bends at each side of the central portion, the free ends of the horizontal bends being thence bent in a vertical plane extending transversely to the plane of the lenses and attached at their free ends to the attaching devices.

5. In eyeglasses, the combination with the lenses of a bridge connecting them and having a central portion, and horizontal resilient and vertical loops formed transversely to the plane of the lenses at the ends of the central portion, the ends of the vertical loops forming attaching arms.

6. In eyeglasses, the combination with the lenses, and the attaching devices thereon for the guards and bridge, of a bridge spring connecting the lenses having substantially horizontal and vertical loops formed therein, the vertical loops being transverse to the plane of the lenses and having their ends forming vertically-extending attaching arms for entering the correspondingly-formed attaching devices.

7. In eyeglasses, the combination with the lenses, and the attaching devices thereon for the guards and bridge, of a bridge spring connecting the lenses having substantially horizontal loops formed therein, and vertical loops extending transversely of the plane of the lenses forming continuations of the horizontal loops and having upwardly-extending attaching arms for entering the attaching devices.

8. In eyeglasses, the combination with the lenses, and attaching devices thereon for the guards and bridge, of a bridge spring connecting the lenses having substantially horizontal loops formed therein above the attaching devices, and vertical loops extending around the attaching devices and provided with upwardly-extending attaching arms for entering the attaching devices.

9. In eyeglasses, the combination with the lenses, and the attaching devices thereon for the guards and bridge, of a bridge spring having its central portion arched and its rearwardly-extending ends extended outwardly, forwardly, transversely of the lenses downwardly, rearwardly and upwardly and attached to the attaching devices.

10. In eyeglasses, the combination with the lenses the vertically opening boxes thereon and the guards, of a spring composed of flat metal having the central connecting portion provided with the horizontal U-shaped loops open at the front and arranged between the lenses and above the boxes and the attaching arms entering the boxes.

11. In eyeglasses, the combination with the lenses, the vertically-extending boxes thereon arranged between the lenses, and the guards, of a spring composed of flat metal having the central connecting portion provided with the horizontal U-shaped loops open at the front and arranged between the lenses and above the boxes and downwardly and upwardly extending arms entering said boxes.

12. In an eyeglass mounting, lens attaching devices and a spring bridge having loops arranged over the lens attaching devices thence extending downwardly on one side of the lens attaching devices and secured to the latter.

13. In an eyeglass mounting, lens attaching devices having vertically arranged seats, and a spring bridge having its bridging portion arranged in a plane in front of the lens attaching devices and formed with a U-shaped bend at each end, one arm of each bend being arranged in front of one of the lens attaching devices and the other arm being connected with one of the vertically arranged seats.

14. In an eyeglass mounting, a lens attaching device having a vertically arranged seat, and a spring bridge having a loop therein located directly above the lens attaching device and an upwardly extending attaching arm seated in the vertically arranged seat.

15. In an eyeglass mounting, a lens attaching device, and a spring bridge having a vertically disposed attaching arm secured to the attaching device, and a forwardly opening horizontal loop arranged directly above the attaching device and the end of the attaching arm.

16. In an eyeglass mounting, a lens attaching device and a spring bridge comprising a bridging portion arranged in a plane above the lens attaching device, a vertical attaching arm and a connecting portion between it and the bridging portion arranged in front of the lens attaching device.

17. A spring bridge comprising a bridging portion, loops arranged at the ends of the bridging portions, and attaching ends extending toward the loops at their free ends.

18. A spring bridge comprising a bridging portion, loops arranged at the ends of the bridging portion and upwardly extending attaching arms below the loops.

LEO F. ADT.

Witnesses:
F. F. CHURCH,
G. WILLARD RICH.